(No Model.)
J. BAIRD.
CHAIN GEARING.
No. 443,591. Patented Dec. 30, 1890.
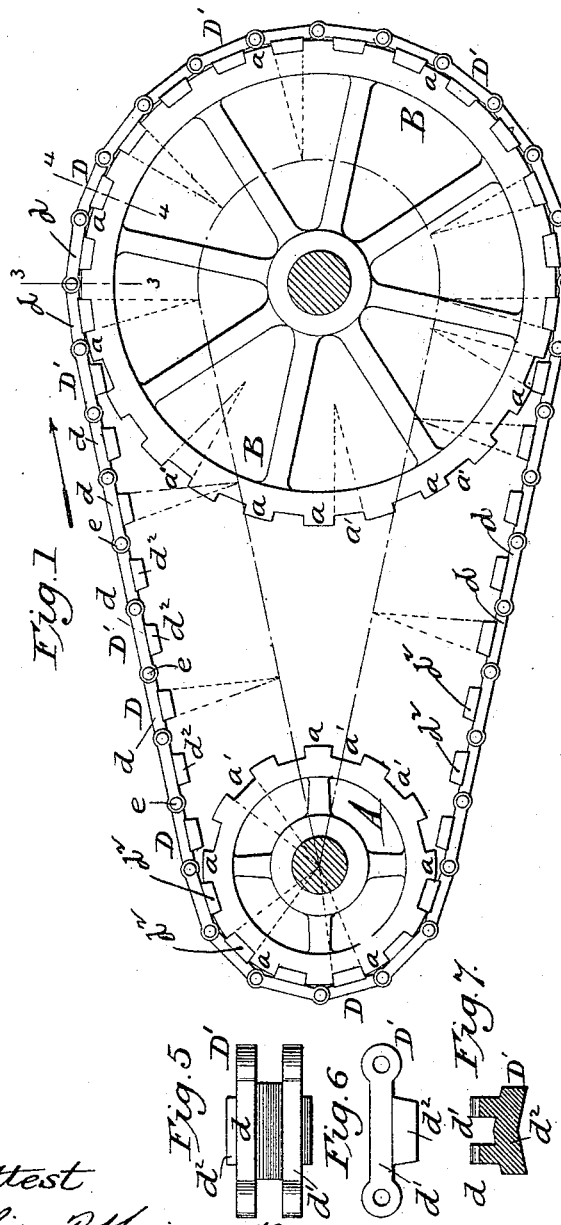
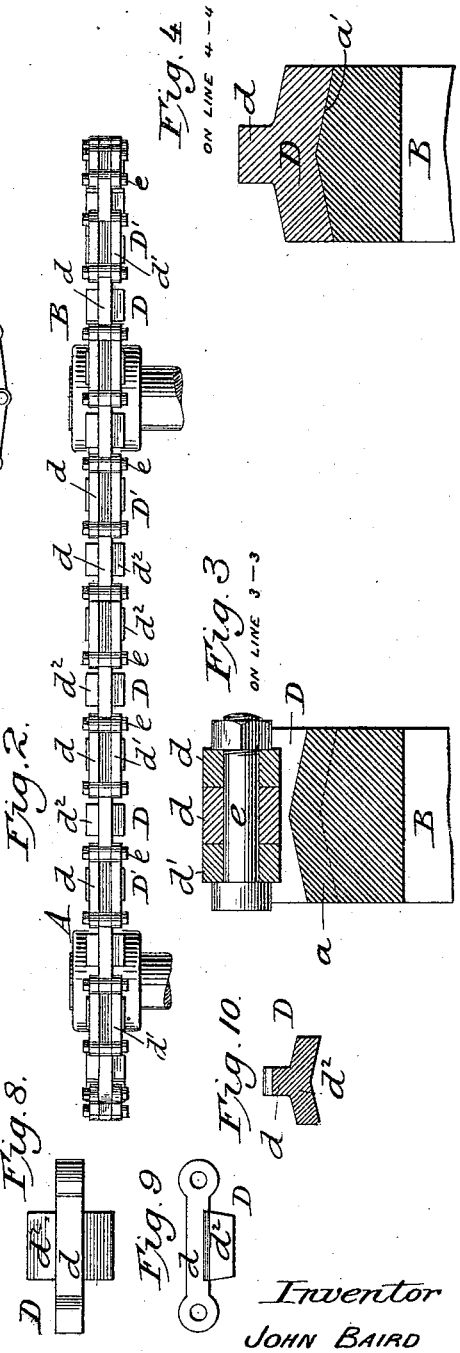
Attest
Sidney P. Hollingsworth
B. Miller
Inventor
JOHN BAIRD
by his attorneys.
Baldwin Davidson & Wight

UNITED STATES PATENT OFFICE.

JOHN BAIRD, OF NEW YORK, N. Y.

CHAIN-GEARING.

SPECIFICATION forming part of Letters Patent No. 443,591, dated December 30, 1890.

Application filed September 17, 1890. Serial No. 365,211. (No model.)

*To all whom it may concern:*

Be it known that I, JOHN BAIRD, mechanical engineer, of the city, county, and State of New York, have invented certain new and useful Improvements in Chain-Gearing, of which the following is a specification.

My invention relates to that class of chain or sprocket gearing in which teeth or spurs on the chain-links engage with recesses on the wheels or shafts actuated thereby.

The object of my invention is to enable such gearing to be run at high speeds, smoothly, and without undue wear or liability to breakage, which ends I attain by the novel combination and organization of instrumentalities hereinafter specified.

In the accompanying drawings, which represent my improvements as adapted to two wheels of different diameters, Figure 1 represents a side elevation with the shafts in section, and Fig. 2 a plan thereof. Fig. 3 is a vertical transverse section through one of the wheels and the chain on the line 3 3 of Fig. 1, being the point of connection of two adjacent links, while Fig. 4 represents a similar section on the line 4 4 of Fig. 1 through the center of one of the eye-bars and its saddle. Figs. 5, 6, and 7 are respectively a plan, elevation, and cross-section through a saddle having two eye-bars; and Figs. 8, 9, and 10, similar views of a saddle having a single eye-bar.

The wheels A B are made with rectangular teeth or sprockets of a general form common in clock-gearing, constituting abutments $a$ and seats $a'$ for the belt-saddles, hereinafter described, the abutments and seats being spaced equally around the entire perimeter of the wheels. The distance between the abutments is such that the saddles fit snugly therein. The teeth are arranged in the longitudinal center of the wheel, the edges of the rim being sloped away from the center, so as to retain the strain on the wheels.

The belt or chain is composed of a series of links D D', consisting of eye-bars $d\, d'$, having a central saddle $d^2$. Each alternate link has two parallel eye-bars, between the ends of which the adjacent end of the corresponding eye-bar fits, the two being united by a round pivot-pin $e$. This construction brings the bearings of the pins so close together as to enable the pins to offer the greatest resistance to transverse or shearing strain. The saddles are made to fit snugly between the abutments on the wheels. Their end faces, instead of being parallel to each other, are made inclined or tapering, with the radius of each face coincident with the radii of the smaller sprocket-wheel, as shown by the dotted lines in Fig. 1.

The eye-bars are straight and of a length between the pivots equal to the distance from the center of one tooth to the center of the next, the center of the pivots and the center of the teeth preferably coinciding. The ends of the eye-bars, as will be seen, overlap the teeth or abutments, but do not rest upon them, a clear space intervening; but the bottom and front and rear faces of the saddles rest firmly upon the seats in the wheels. The faces of the teeth or abutments are also sloped on radial lines coincident with those of the saddles, so that they fit snugly when interlocked. One wheel of course acts as a driving or leading and the other as a driven or following wheel. The larger wheel B in this instance is the driving-wheel and turns to the right. In so doing the rear face of the saddles bears against the front face of the corresponding abutments, and is thus drawn or forced around, creating a tension on the chain, which turns the following wheel in a similar manner, except that the tension is exerted on the front face of the saddle and the rear face of the abutment, instead of acting on the opposite faces of these parts, as in the other wheel. As the drawings show, a much larger number of teeth of the driving-wheel are engaged with the chain than those of the driven wheel, and the chain is thus capable of exerting great strain.

The links, it will be observed, although straight, conform readily to the curvature of the wheel, and thus the saddles readily engage or disengage themselves from the wheels and are thus enabled to work smoothly and rapidly.

As the saddles, seats, and abutments all have straight, flat, or fair faces engaging snugly, and so many of them, the abutments need project but slightly beyond the face of the wheel in order to give the necessary resisting-surface to the tension. A projection equal to about one-third or one-fourth the length of the seat will be sufficient. The radial form of the faces of the seats and saddles gives them an easy rapid clearance.

The eye-bars lying so close together throws the torsional strain centrally and longitudinally upon them, and the sloping of the edges tends to keep the belt on this line, thus insuring steadiness of working.

My improved chain-gearing, it will be observed, is operated by the direct interlocking of the teeth and saddles, and not by friction.

Sprocket-gearing of various forms is well known in the art; but, so far as I am aware, I am the first to construct the teeth and the saddles interlocking therewith with front and rear faces forming radii of the wheels around which the chain passes.

Having thus described the construction and operation of my improved chain-gearing, what I claim therein as new and as of my own invention is—

1. The chain-link D, constructed, as described, with a central longitudinal eye-bar $d$ and a central longitudinal saddle or tooth $d^2$, having its front and rear faces inclined coincidently with the radii of a circle of the diameter of the wheel it traverses to adapt it to engage positively with corresponding transverse notches in said wheel.

2. The intermediate chain-link D', constructed, as described, of two parallel longitudinal eye-bars $d\ d'$, with an interposed central longitudinal saddle $d^2$, the front and rear abutments of which are inclined coincidently with the radii of a circle of the diameter of the wheel it traverses and with the correspondingly-inclined transverse notches of which it positively interlocks.

3. A chain belt constructed, substantially as hereinbefore set forth, of the alternate double and single chain-links composed of eye-bars $d\ d'$, connected by a pivot and carrying longitudinal saddles $d^2$, the front and rear faces of which are inclined coincidently with the radii of a circle of the diameter of the wheel it traverses and with the correspondingly-inclined transverse notches of which these faces of the saddles positively interlock.

4. The combination, substantially as hereinbefore set forth, of an endless chain or belt, saddles or teeth carried thereby, and a sprocket-wheel provided with seats and abutments constituting teeth to interlock with the front and rear faces of the saddles or teeth of the chain or belt, both the abutments and saddles having faces coincident with radii of the sprocket-wheel.

5. The combination, substantially as hereinbefore set forth, of an endless chain of jointed eye-bars, a central saddle carried by each link, and a sprocket-wheel provided with seats and abutments constituting teeth to interlock with the front and rear faces of the saddles of the chain, both the abutments and saddles having faces coincident with radii of the sprocket-wheel.

6. The combination, substantially as hereinbefore set forth, of a sprocket-wheel having teeth the front and rear faces of which coincide with radii of the wheel, an outwardly-inclined flanged rim on each side of the teeth, and a chain consisting of pivoted eye-bars carrying central saddles and having outwardly-inclined rims corresponding with the rim of the driving-wheel.

7. The combination, substantially as hereinbefore set forth, of sprocket-wheels of different diameters having central teeth formed thereon with abutments or faces coincident in front and rear with the radii of the smaller wheel, and a chain connecting the wheels, composed of jointed eye-bars carrying central saddles with abutments of coincident radius engaging positively with the front and rear faces of the teeth.

In testimony whereof I have hereunto subscribed my name.

JOHN BAIRD.

Witnesses:
HUBERT TURPER,
ADDISON W. BAIRD.